United States Patent
Hasegawa et al.

(10) Patent No.: US 12,420,556 B2
(45) Date of Patent: Sep. 23, 2025

(54) CONTAINER AND METHOD OF MANUFACTURING SAME

(71) Applicant: CANON KABUSHIKI KAISHA, Tokyo (JP)

(72) Inventors: Shuichi Hasegawa, Kanagawa (JP); Yukuo Yamaguchi, Tokyo (JP); Keisuke Iinuma, Kanagawa (JP); Junichiro Iri, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 210 days.

(21) Appl. No.: 18/342,102

(22) Filed: Jun. 27, 2023

(65) Prior Publication Data
US 2024/0010004 A1    Jan. 11, 2024

(30) Foreign Application Priority Data
Jul. 6, 2022    (JP) .................... 2022-109186

(51) Int. Cl.
*B41J 2/175*    (2006.01)
*B29L 31/00*    (2006.01)

(52) U.S. Cl.
CPC ....... *B41J 2/17523* (2013.01); *B41J 2/17553* (2013.01); *B41J 2/17559* (2013.01); *B29L 2031/7678* (2013.01)

(58) Field of Classification Search
CPC ............... B41J 2/17513; B41J 2/17523; B41J 2/17553; B41J 2/17566; B41J 2002/17572; B29C 33/0055; B29C 33/10; B29C 45/0046; B29C 45/14336;
(Continued)

(56) References Cited

U.S. PATENT DOCUMENTS 3,698,961 A    10/1972 Niemann
6,415,121 B1    7/2002 Suzuki et al.
(Continued)

FOREIGN PATENT DOCUMENTS

DE    102019134649 A1    6/2021
DE    102020106586 A1    9/2021
(Continued)

OTHER PUBLICATIONS

Partial European Search Report in European Application No. 23183357.5 (Nov. 2023).
(Continued)

*Primary Examiner* — Anh T Vo
(74) *Attorney, Agent, or Firm* — Venable LLP

(57) ABSTRACT

There is used a container which includes a first member which serves as a lid portion, a second member which serves as a container portion, and resin with which a flow path, which is formed between the first member and the second member when the first member and the second member come into contact with each other, is filled, the resin bonds the first member and the second member to each other by reaching a filling target position after flowing in from an inflow opening to the flow path, and an opening portion exposed to an exterior of the container is provided at a position where the resin having flowed in from the inflow opening flows out beyond the filling target position in the flow path.

13 Claims, 16 Drawing Sheets

(58) Field of Classification Search
CPC .......... B29C 45/14467; B29C 45/2669; B29C 45/34; B29L 2031/7678
See application file for complete search history.

(56) References Cited

U.S. PATENT DOCUMENTS

| | | | |
|---|---|---|---|
| 7,207,307 B2* | 4/2007 | Ino | F02M 35/1283 |
| | | | 123/184.21 |
| 7,404,884 B2* | 7/2008 | Montminy | B29C 70/845 |
| | | | 204/635 |
| 8,682,211 B2 | 3/2014 | Hoshi et al. | |
| 8,909,096 B2 | 12/2014 | Fukui et al. | |
| 9,188,940 B2 | 11/2015 | Fukui et al. | |
| 10,377,089 B2* | 8/2019 | Wakayama | B29C 66/532 |
| 10,471,719 B2 | 11/2019 | Toda et al. | |
| 10,828,812 B2 | 11/2020 | Iwano et al. | |
| 11,014,361 B2 | 5/2021 | Kitayama et al. | |
| 11,518,577 B2* | 12/2022 | Suzuki | B41J 2/17503 |
| 2009/0122125 A1 | 5/2009 | Owaki et al. | |
| 2011/0170903 A1 | 7/2011 | Hoshi et al. | |
| 2018/0043626 A1* | 2/2018 | Wakayama | B41J 2/17513 |

FOREIGN PATENT DOCUMENTS

| | | |
|---|---|---|
| GB | 975059 A | 11/1964 |
| JP | 2013-186418 A | 9/2013 |
| JP | 2019-051597 A | 4/2019 |
| JP | 2019-64277 A | 4/2019 |

OTHER PUBLICATIONS

Extended European Search Report in European Application No. 23183357.5 (Mar. 2024).

* cited by examiner

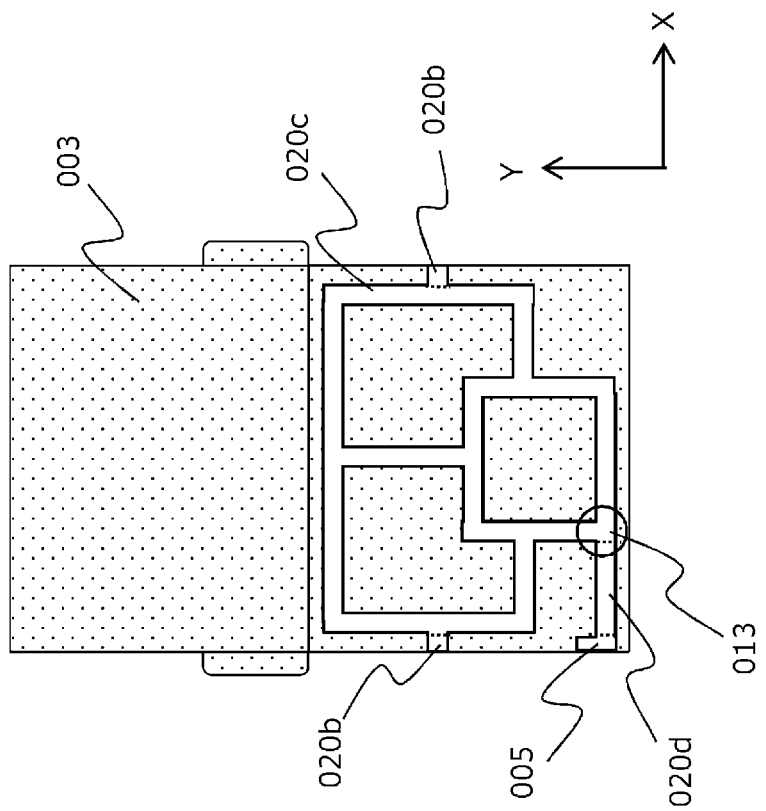
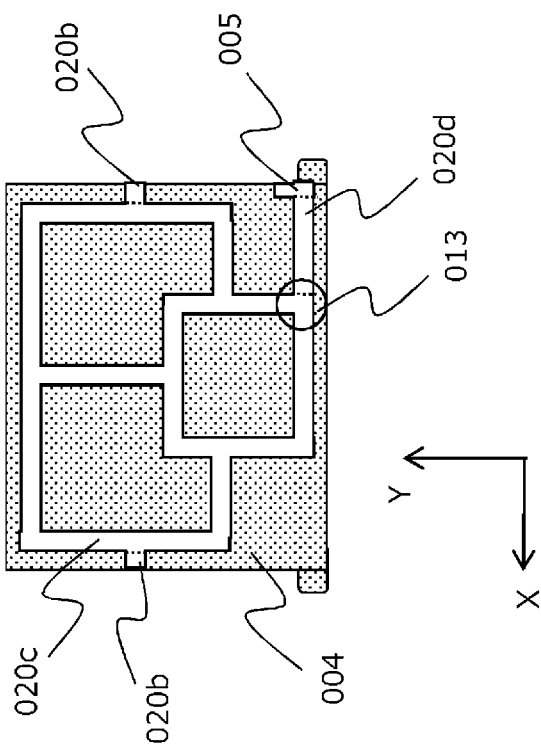
FIG. 4A
FIG. 4B

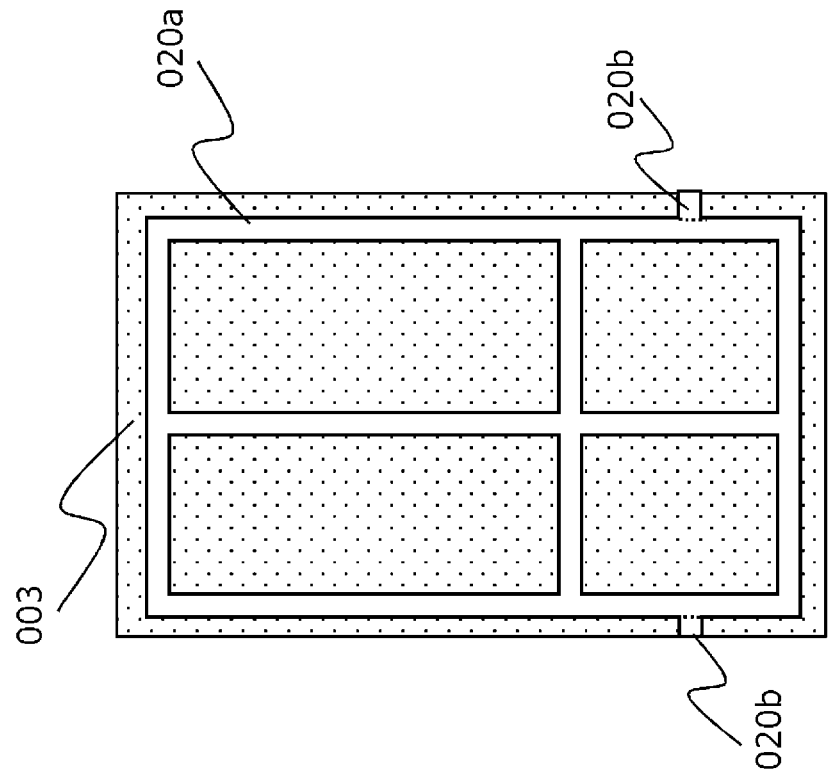
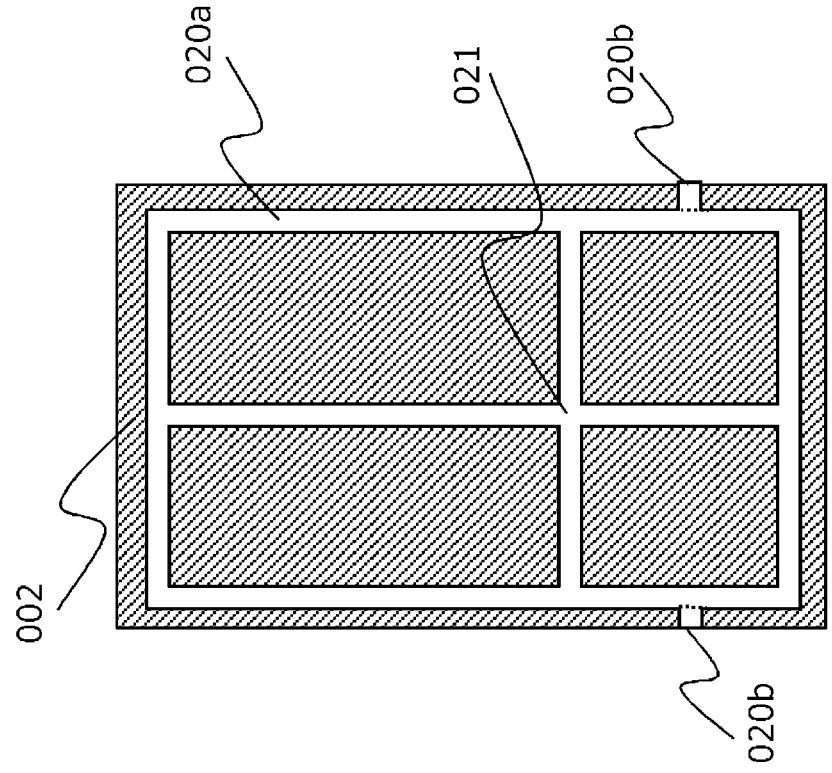

VISUAL FIELD A

VISUAL FIELD B

VISUAL FIELD C

VISUAL FIELD D

CONTAINER AND METHOD OF MANUFACTURING SAME

BACKGROUND OF THE INVENTION

Field of the Invention

The present invention relates to a container and a method of manufacturing the same.

Description of the Related Art

An inkjet recording head mounted on an inkjet recording apparatus includes an inkjet recording cartridge which stores liquid ink. Such an inkjet recording cartridge is manufactured conventionally by bonding a tank case and a lid which are molded members to each other by ultrasonic welding. In addition, in a multi-color inkjet recording cartridge, a flow path plate is also bonded by supersonic welding. In recent years, there is proposed a method in which, when the inkjet recording head or the inkjet recording cartridge is manufactured, molded members are coupled to each other and are bonded together with molten resin by using an in-mold assembly molding technique.

Japanese Patent Application Publication No. 2019-051597 discloses a manufacturing method of a liquid container in which a container portion and a lid which constitute the liquid container are bonded to each other with resin. FIG. 15 is a schematic perspective view of a conventional liquid container 108, and shows a form in which a lid portion (first molded member 102) and a container portion (second molded member 103) are bonded to each other.

FIG. 16 is a cross-sectional view of the liquid container 108 taken along the line A-A of FIG. 15. A partition 111 is provided in a liquid storage portion 103a formed inside the second molded member 103 and, with this, a plurality of types of liquids (e.g., inks having a plurality of colors) can be separated and stored. In the first molded member 102, a pair of protrusion portions 109 which are fitted on the partition 111 to prevent displacement at the time of coupling and spaces 110 (bonding grooves) into which molten resin 112 is injected are provided in fitting portions fitting to the second molded member 103. The second molded member 103 and the first molded member 102 can be bonded to each other with high accuracy by pouring the molten resin 112 into the spaces 110.

SUMMARY OF THE INVENTION

Herein, in a case where the molten resin is poured for coupling two molded members such as the container portion and the lid portion to each other, there is a possibility that trouble (e.g., leakage, overflowing, or shortage) of bonding resin may occur. In addition, in the technique of Japanese Patent Application Publication No. 2019-051597, the state of the inside of a molded article obtained by bonding the container portion and the lid to each other with the molten resin cannot be visually recognized from the outside of the container, and hence a problem arises in that the state of the resin used in the bonding cannot be identified. Accordingly, even when the trouble of the molten resin occurs, it is difficult to determine the state of the trouble.

The present invention has been made in view of the above problem, and an object thereof is to facilitate ascertaining a state of bonding resin when a plurality of members are bonded together with molten resin by using an in-mold assembly molding technique.

The present invention provides a container comprising:
a first member which serves as a lid portion;
a second member which serves as a container portion; and
resin with which a flow path, which is formed between the first member and the second member when the first member and the second member come into contact with each other, is filled, wherein
the resin bonds the first member and the second member to each other by reaching a filling target position after flowing in from an inflow opening to the flow path, and
an opening portion exposed to an exterior of the container is provided at a position where the resin having flowed in from the inflow opening flows out beyond the filling target position in the flow path.

The present invention also provides a method of manufacturing a container including a first member which serves as a lid portion and a second member which serves as a container portion,
a flow path for resin being formed between the first member and the second member when the first member and the second member come into contact with each other, the method comprising:
forming the flow path by causing the first member and the second member to come into contact with each other inside a mold; and
bonding the first member and the second member to each other by causing the resin to flow in from an inflow opening to the flow path and to reach a filling target position, wherein
an opening portion exposed to an exterior of the container is provided at a position where the resin having flowed in from the inflow opening flows out beyond the filling target position in the flow path.

According to the present invention, it becomes possible to facilitate ascertaining the state of the bonding resin when the plurality of members are bonded together with the molten resin by using the in-mold assembly molding technique.

Further features of the present invention will become apparent from the following description of exemplary embodiments with reference to the attached drawings.

BRIEF DESCRIPTION OF THE DRAWINGS

FIGS. 4A and 4B are exploded plan views each showing the opening portion in Embodiment 1;

FIGS. 5A and 5B are exploded plan views each showing a flow path into which molten resin flows in Embodiment 1;

DESCRIPTION OF THE EMBODIMENTS

Hereinbelow, preferred embodiments of the present invention will be illustratively described in detail with reference to the drawings. Note that the dimensions, materials, shapes, and relative arrangements of components described in the following embodiments should be appropriately changed according to the configuration and various conditions of an apparatus to which the present invention is applied. Accordingly, unless otherwise specified expressly, it is not intended to limit the scope of the present invention to the dimensions, materials, shapes, and relative arrangements thereof.

The present invention is suitable for manufacturing of a molded article which uses an in-mold molding technique. In in-mold molding, a plurality of molded members are housed in a mold in a state in which the plurality of molded members are in contact with each other or fitted to each other, and the plurality of molded members are bonded together by pouring molten resin into a flow path such as a bonding groove. The molded article in the present invention can be especially preferably applied to, e.g., a liquid container including a lid portion and a container portion, and a manufacturing method thereof. An example of the liquid container includes an inkjet recording cartridge used in an inkjet recording head of an inkjet recording apparatus.

Embodiment 1

Configuration

Figure 1:
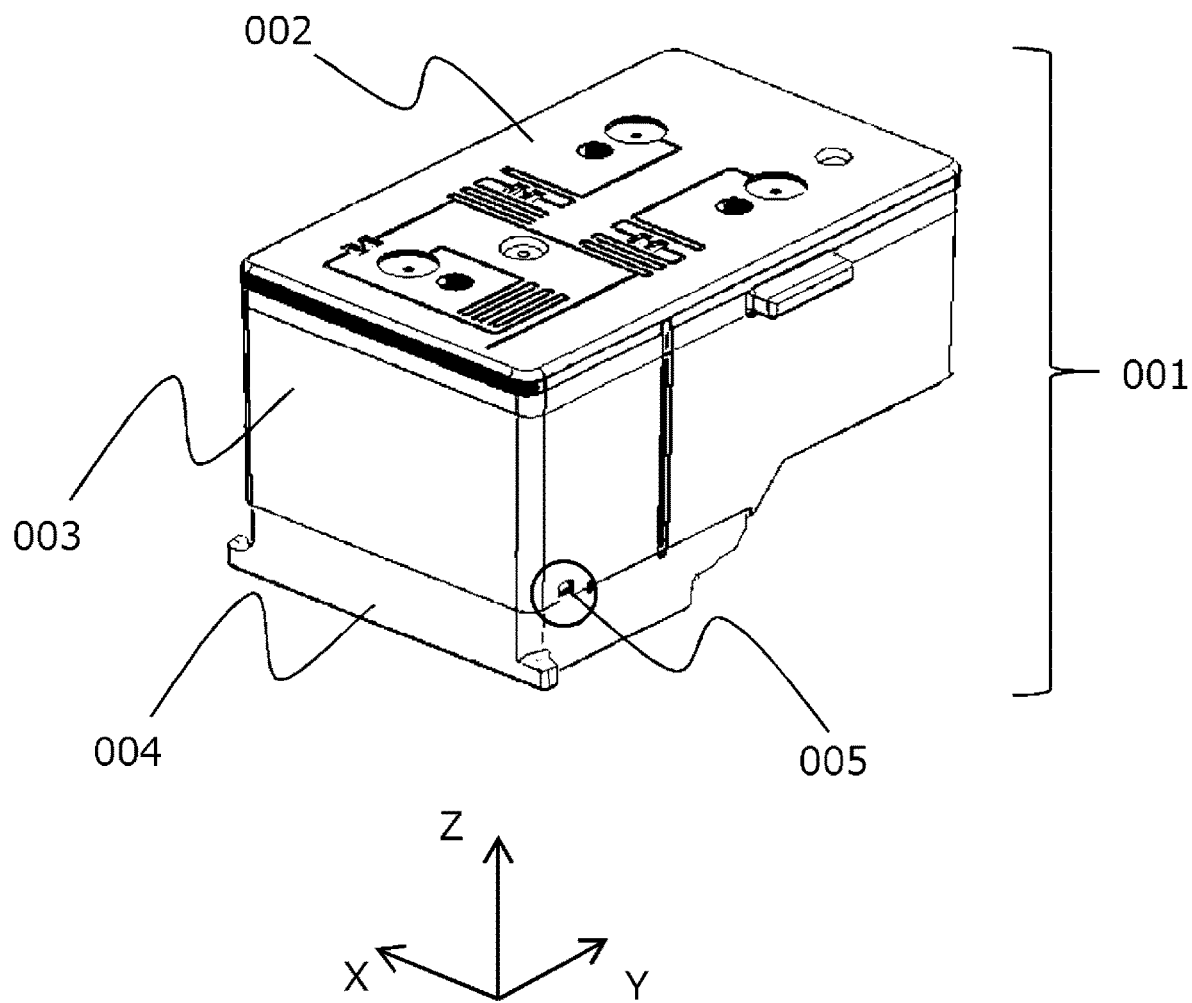
FIG. 1 is a schematic perspective view of an inkjet recording cartridge.

FIG. 1 is a perspective view showing an example of the inkjet recording cartridge (hereinafter described as "cartridge 001"). The cartridge 001 includes a first molded member 002, a second molded member 003, a third molded member 004, and an opening portion 005.

Figure 2:
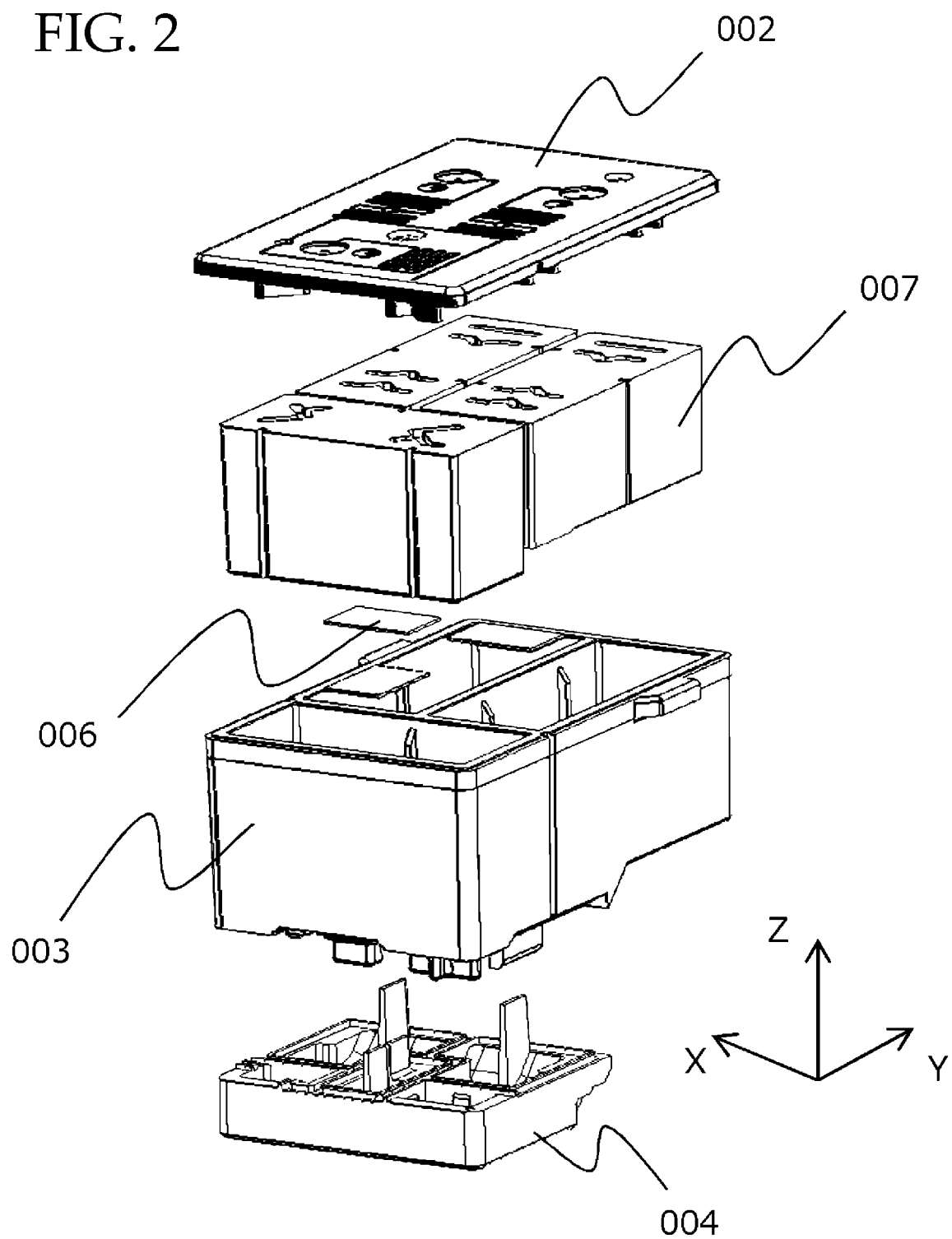
FIG. 2 is an exploded perspective view of the inkjet recording cartridge.

FIG. 2 is an exploded perspective view of the cartridge 001. A filter 006 and an absorbing body 007 are incorporated into the first molded member 002, the second molded member 003, and the third molded member 004. In the present embodiment, the first molded member 002 is a lid of a container, and the second molded member 003 is a liquid storage tank. A chip is stuck to the third molded member 004, and the third molded member 004 functions as a component which discharges liquid. Note that the present invention can be applied to any configuration in which at least two members are bonded to each other and a container is thereby formed. In the case where a liquid container is manufactured, at least a first member serving as the lid portion and a second member serving as the container portion are bonded to each other. The first member corresponds to the first molded member 002 in the embodiment, and the second member corresponds to the second molded member 003 in the embodiment.

With regard to molten resin 012, it is desirable to use thermoplastic resin having fluidity higher than those of the first molded member 002, the second molded member 003, and the third molded member 004. As each of the first molded member 002, the second molded member 003, and the third molded member 004, a resin material is suitable, and the melting point of the resin material is preferably higher than that of the molten resin 012. Note that the molten resin 012 and the material of each molded member are not limited thereto.

Figure 3:
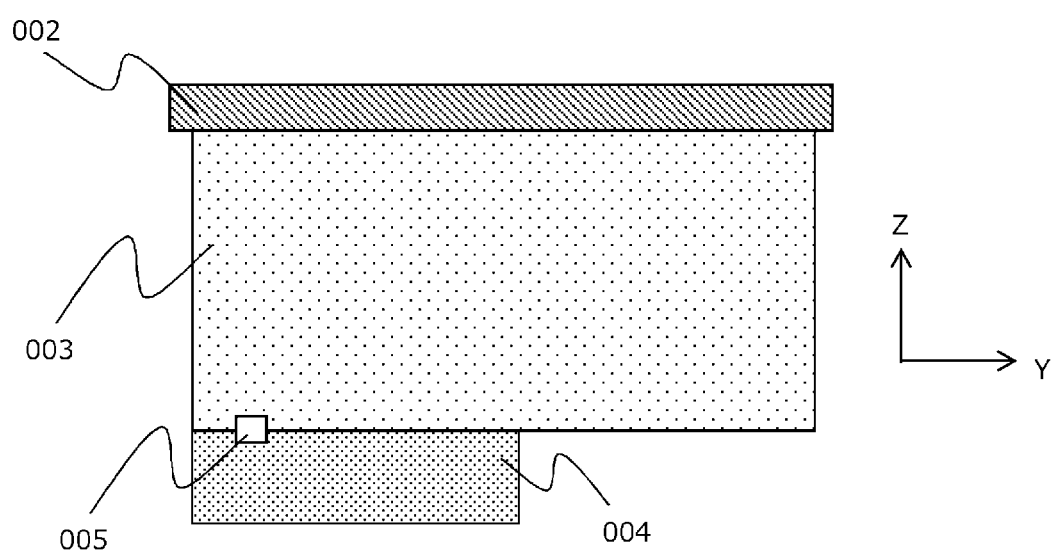
FIG. 3 is a side view showing an opening portion in Embodiment 1.

Each of FIG. 3, FIGS. 4A and 4B, and FIGS. 5A and 5B is a schematic view showing a method of allowing visual recognition of molded article bonding in Embodiment 1. FIG. 3 shows a configuration in which, when the first molded member 002, the second molded member 003, and the third molded member 004 are coupled and bonded together with the molten resin 012, the opening portion 005 which allows visual recognition of the state of the molten resin 012 is provided at an extension of a final filling portion 013. FIG. 3 is a side view showing the opening portion 005 which is provided at the extension of the final filling portion 013 and allows visual recognition of the state of the molten resin 012.

In the cartridge 001 shown in FIG. 3, there are cases where a liquid storage portion is separated into a plurality of liquid storage tanks, and there are cases where the liquid storage portion is constituted by one liquid storage tank. The cartridge 001 having the separation configuration is used for, e.g., a color cartridge, and different storage tanks are provided so as to correspond to liquids (inks) having different colors such as cyan (C), magenta (M), and yellow (Y) on a one-to-one basis. Individual storage layers are separated by partitions. In addition, the cartridge 001 having one liquid storage tank is used as a cartridge for one color such as, e.g., a cartridge for black (BK).

FIG. 4A is a plan view showing a bonding surface of the third molded member 004 to the second molded member 003. In the third molded member 004, a flow path 020 in which the molten resin 012 flows is provided. The flow path 020 in FIG. 4A includes a lower flow path 020c, vertical communication flow paths 020b (one on the left and one on the right), and an opening portion communication flow path 020d. While dotted lines for indicating boundaries are drawn at boundaries between the lower flow path 020c, the vertical communication flow paths 020b, the opening portion communication flow path 020d, and the opening portion 005 for the sake of convenience, these flow paths and the opening portion actually communicate with each other. Note that terms "upper" and "lower" used in the present specification are used for the sake of convenience of explanation, and are not intended to define upper and lower sides when an actual container is disposed.

FIG. 4B is a plan view showing a bonding surface of the second molded member 003 to the third molded member 004. Also in the second molded member 003, the flow path 020 in which the molten resin 012 flows is provided. The flow path 020 in FIG. 4B also includes the lower flow path 020c, the vertical communication flow paths 020b (one on the left and one on the right), and the opening portion communication flow path 020d. Similarly, the dotted lines which indicate boundaries are drawn for the sake of convenience. When the second molded member 003 and the third molded member 004 come into contact with each other, corresponding groove-shaped flow paths overlap each other to form a flow path hole through which the molten resin 012 flows.

FIG. 5A is a plan view showing a bonding surface of the first molded member 002 to the second molded member 003. In the first molded member 002, the flow path 020 in which the molten resin 012 flows is provided. The flow path 020 in FIG. 5A includes an upper flow path 020a and the vertical communication flow paths 020b (one on the left and one on the right). In addition, out of both surfaces of the first molded member 002, on a surface (second surface) on the opposite side of the bonding surface (first surface) shown in the drawing, a gate 021 serving as an inflow opening of the resin is provided. As shown in the drawing, the gate 021 communicates with the upper flow path 020a through the inside of the first molded member 002.

FIG. 5B is a plan view showing a bonding surface of the second molded member 003 to the first molded member 002. Also in the second molded member 003, the flow path 020 in which the molten resin 012 flows is provided. The flow path 020 in FIG. 5B also includes the upper flow path 020a and the vertical communication flow paths 020b (one on the left and one on the right). When the first molded member 002 and the second molded member 003 come into contact with each other, corresponding groove-shaped flow paths overlap each other to form a flow path hole through which the molten resin 012 flows. In addition, when the first molded member 002, the second molded member 003, and the third molded member 004 are bonded together and are disposed in a mold, the vertical communication flow paths 020b function as the flow paths used when the molten resin 012 injected into the upper flow path 020a from the gate 021 flows into the lower flow path 020c.

In the present embodiment, in order to form the flow path, similar grooves are formed in both of two bonding surfaces which come into contact with each other. With this, bonding having high strength is allowed. However, the configuration for the formation of the flow path is not limited thereto. For example, a configuration may also be adopted in which a continuous groove is provided in one of the bonding surfaces, and a discontinuous groove is provided in the other one thereof. In addition, for example, a configuration may also be adopted in which a groove is provided in one of the bonding surfaces and the groove is not provided in the other one thereof. It is possible to adopt any method which allows the formation of the flow path through which the molten resin 012 can pass when the bonding surfaces are bonded to each other.

Processes of Manufacturing And Inspection

A description will be given of processes of a method of manufacturing the cartridge 001 including the liquid storage tank as in the present embodiment, and an inspection method.

Figure 6:
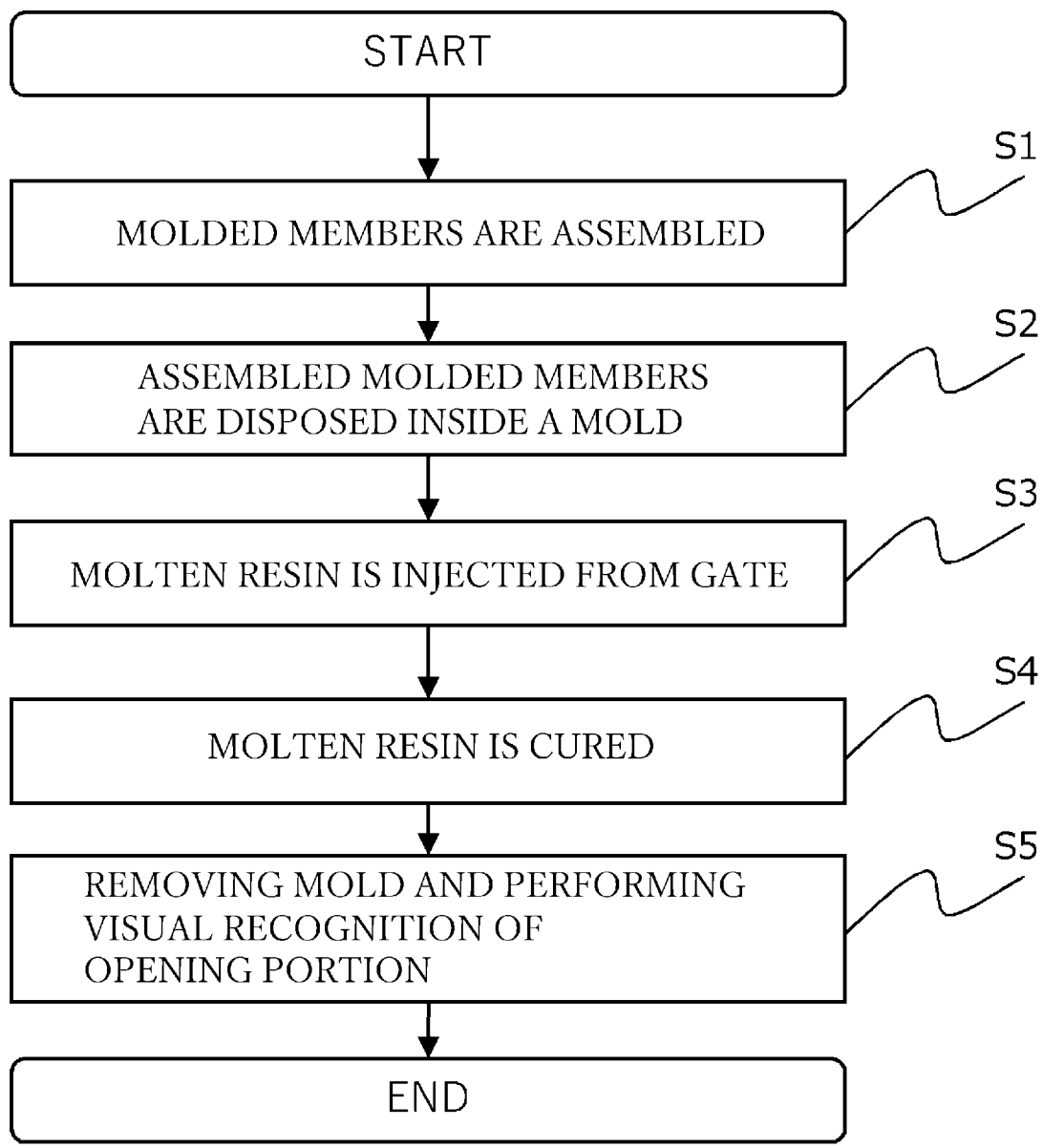
FIG. 6 is a flowchart showing processes of manufacturing and inspection of a liquid container.

In a flowchart in FIG. 6, processing of the present embodiment is started at a point of time when the individual molded members and members such as the filter and the absorbing body incorporated into the inside of the container are prepared. In Step S1, the individual members are assembled, as shown in FIG. 2. At this point, it is preferable that fitting portions provided in the individual molded members are fitted to each other. Next, in Step S2, the assembled molded members are disposed inside a mold. At this point, the gate 021 is brought into a state in which the gate 021 can be accessed from the outside of the mold. In addition, the opening portion 005 is brought into a state in which the opening portion 005 faces an inner wall of the mold. With this, the molten resin 012 having reached the opening portion 005 is covered with the mold, and hence the molten resin 012 will not flow out to an exterior of the cartridge 001.

Next, in Step S3, the molten resin 012 is injected from the gate 021, and the flow path 020 is thereby filled with the molten resin 012. Specifically, first, the upper flow path 020a is filled with the molten resin 012 injected from the gate 021. Subsequently, the molten resin 012 reaches the lower flow path 020c via the vertical communication flow path 020b. Then, the molten resin 012 reaches the final filling portion 013 after the lower flow path 020c is filled with the molten resin 012. Note that the final filling portion 013 is a position in the flow path which allows a determination in which bonding is completed without any problem when filling with the resin is completed up to this position when the cartridge 001 is formed, and is a position serving as a target for reaching of the resin. That is, a term "final" does not deny that the resin having reached the final filling portion 013 further flows to the opening portion 005 positioned ahead of the final filling portion 013. Accordingly, "final filling portion" can be referred to as "filling target position". In addition, although described later in detail, the molten resin 012 of the present embodiment reaches the opening portion 005 via the opening portion communication flow path 020d after reaching the final filling portion 013.

Next, in Step S4, the molten resin 012 in the flow path is cured as time elapses. With this, the first molded member 002, the second molded member 003, and the third molded member 004 are bonded together with the molten resin 012, and the cartridge 001 serving as the liquid container is formed. Next, in Step S5, by removing the mold and performing visual recognition of the opening portion 005, inspection of a product is performed.

Then, a description will be given of an inspection method which uses the opening portion 005. As shown in FIG. 3 and FIGS. 4A and 4B, the opening portion 005 is an opening which is provided at the extension of the final filling portion 013 for visually recognizing the state of the molten resin 012 and is exposed to an outer wall of the cartridge 001. A user can inspect whether or not trouble such as leakage, overflowing, or shortage of the molten resin 012 is present by performing the visual recognition of the opening portion 005. Note that "visual recognition" includes not only that the user performs checking by looking at the opening portion 005 but also that the user performs checking by taking a picture of the opening portion 005 with a camera and performing image processing.

A description will be given of the inspection by the visual recognition by using FIGS. 7A and 7B and FIGS. 8A and 8B. Herein, in the present embodiment, the amount of the molten resin 012 is set to an amount which allows not only the final filling portion 013 to be filled with the molten resin 012 but also the molten resin 012 to reach the opening portion 005. In addition, it is determined whether or not the flow path is filled with the resin up to the opening portion 005 when the mold is removed. Subsequently, in the case where the molten resin 012 does not reach the opening portion 005, it is determined that there is a possibility that the trouble such as leakage, overflowing, or shortage of the molten resin 012 may be present. On the other hand, in the case where the opening portion 005 is filled with the cured molten resin 012, it is determined that the trouble is not present.

Note that, in the case where only a part of the opening portion 005 is filled with the molten resin 012 and the remaining part does not have the molten resin 012, it is determined that the trouble is present in general. However, depending on the configuration of the opening portion communication flow path 020d or the opening portion 005, there are cases where it is determined that the product has passed the inspection based on reaching of the molten resin 012 to the opening portion 005.

Figure 7A:
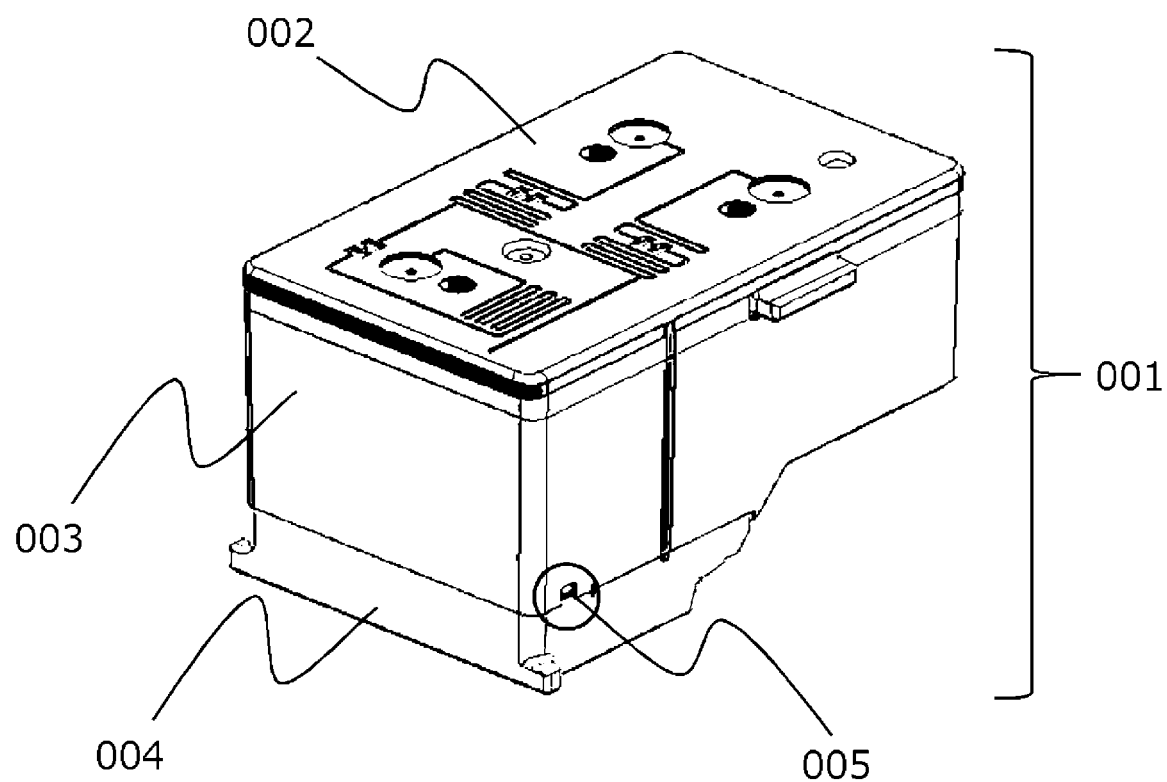
FIGS. 7A and 7B are schematic views each showing a state in which the molten resin is not present in the opening portion in Embodiment 1.
Figure 7B:
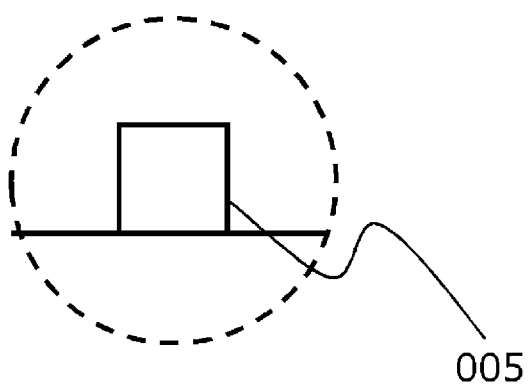

Conventionally, it is possible to identify the leakage or overflowing of the molten resin 012 in an outer appearance portion of the cartridge 001 after molding is completed by visual inspection or the like, but there is no means for identifying the leakage or overflowing in the case where the leakage or overflowing is present inside the cartridge 001. To cope with this, in the present embodiment, the opening portion 005 is provided such that the state of the molten resin 012 can be visually recognized. The inspection method will be described more specifically by using FIGS. 7A and 7B and FIGS. 8A and 8B. FIG. 7A is a schematic perspective view showing a state in which the molten resin 012 is not present in the opening portion 005. FIG. 7B is a partially enlarged view of the opening portion 005. As shown in the drawings, the molten resin 012 does not reach the opening portion 005, and it is determined that the trouble such as leakage or overflowing has occurred.

Figure 8A:
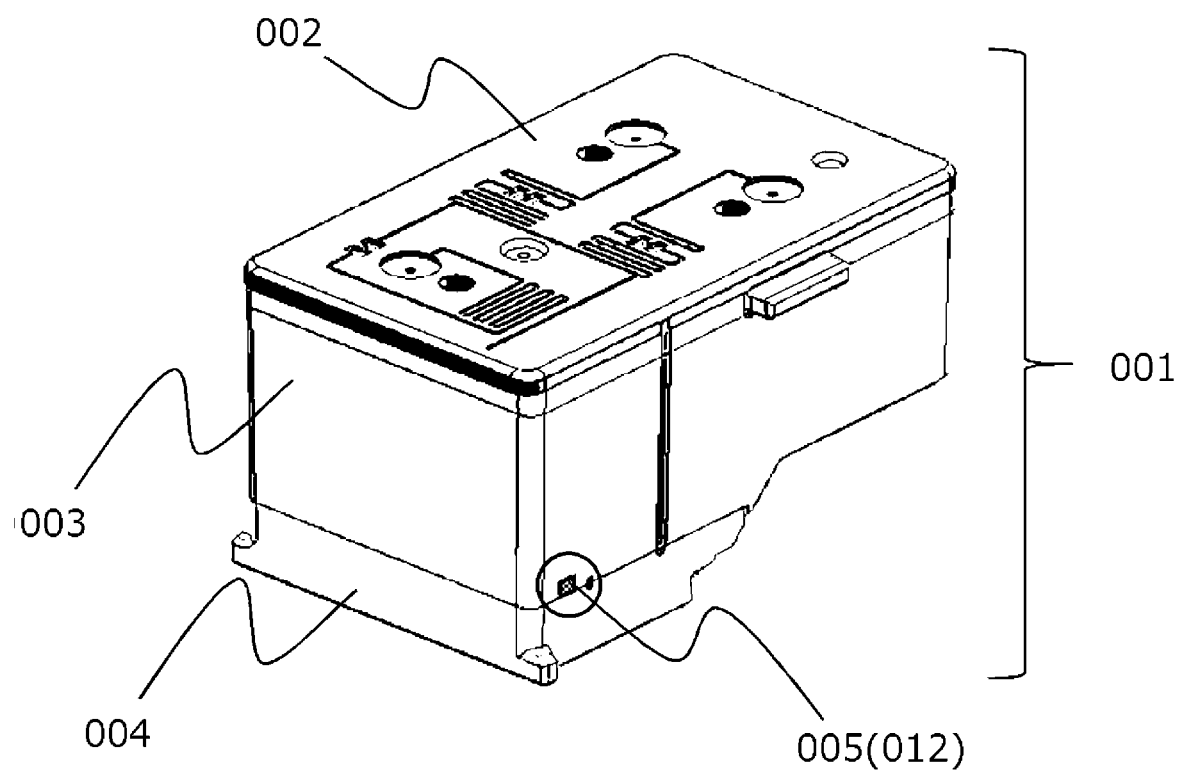
FIGS. 8A and 8B are schematic views each showing a state in which the molten resin is present in the opening portion in Embodiment 1.
Figure 8B:
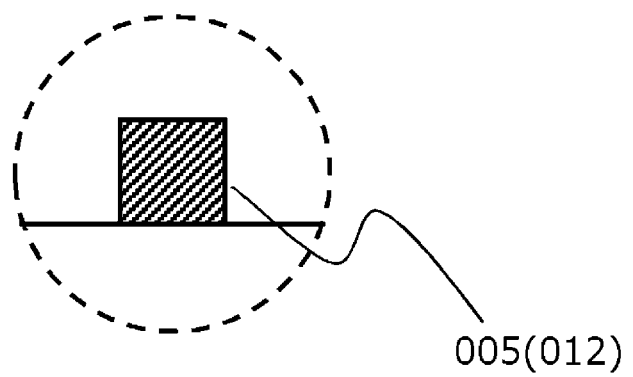

FIG. 8A is a schematic perspective view showing a state in which the molten resin 012 is present in the opening portion 005 in Embodiment 1. FIG. 8B is a partially enlarged view of the opening portion 005. As shown in the drawings, the opening portion 005 is filled with the molten resin 012, and hence it is determined that the trouble is not present.

According to the above configuration, it is possible to determine the state of the molten resin 012 by using the opening portion 005 provided at the extension of the final filling portion 013. That is, when the opening portion 005 is blocked with the molten resin 012, it is possible to determine that the molten resin 012 reaches the final filling portion 013 definitely and bonding between the molded members is reliably performed. As a result, it becomes possible to facilitate grasping of the state of the molten resin 012 when a plurality of members are bonded together with the molten resin 012 by using an in-mold assembly molding technique. In addition, it is possible provide the inspection method which reliably detects the trouble such as leakage, overflowing, or shortage of the molten resin 012.

Embodiment 2

Figure 9:
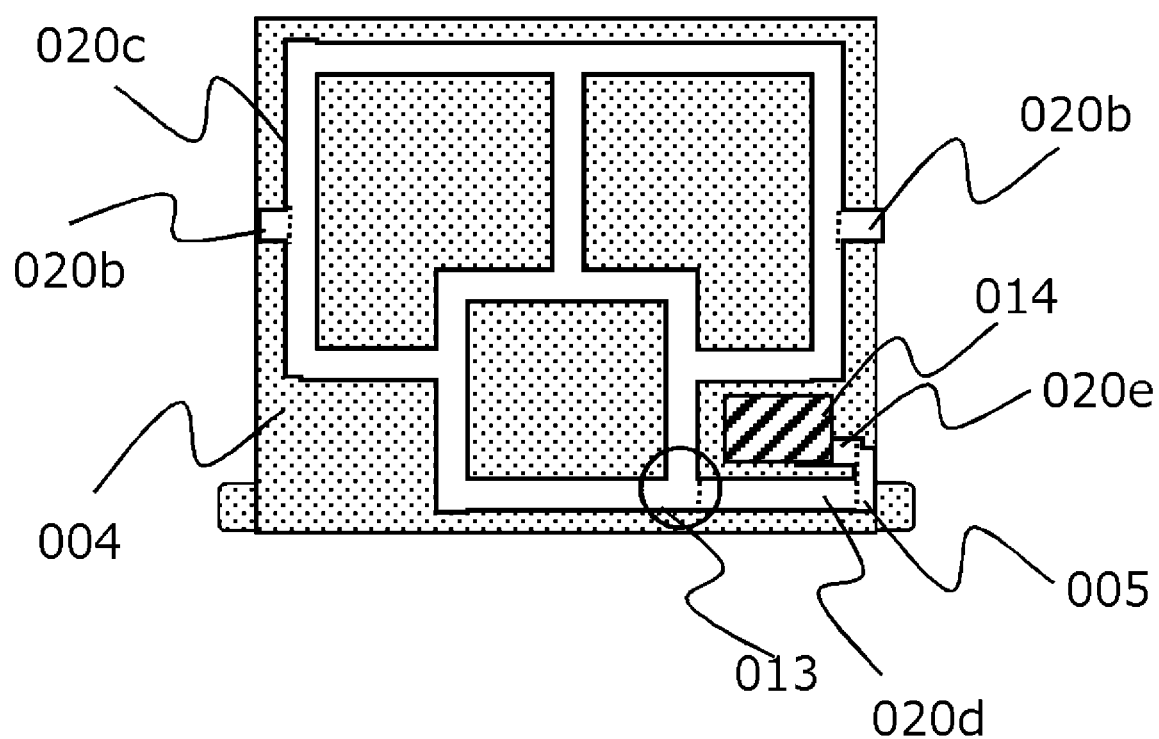
FIG. 9 is a plan view showing a bonding surface of a third molded member to a second molded member in Embodiment 2.
Figure 10:
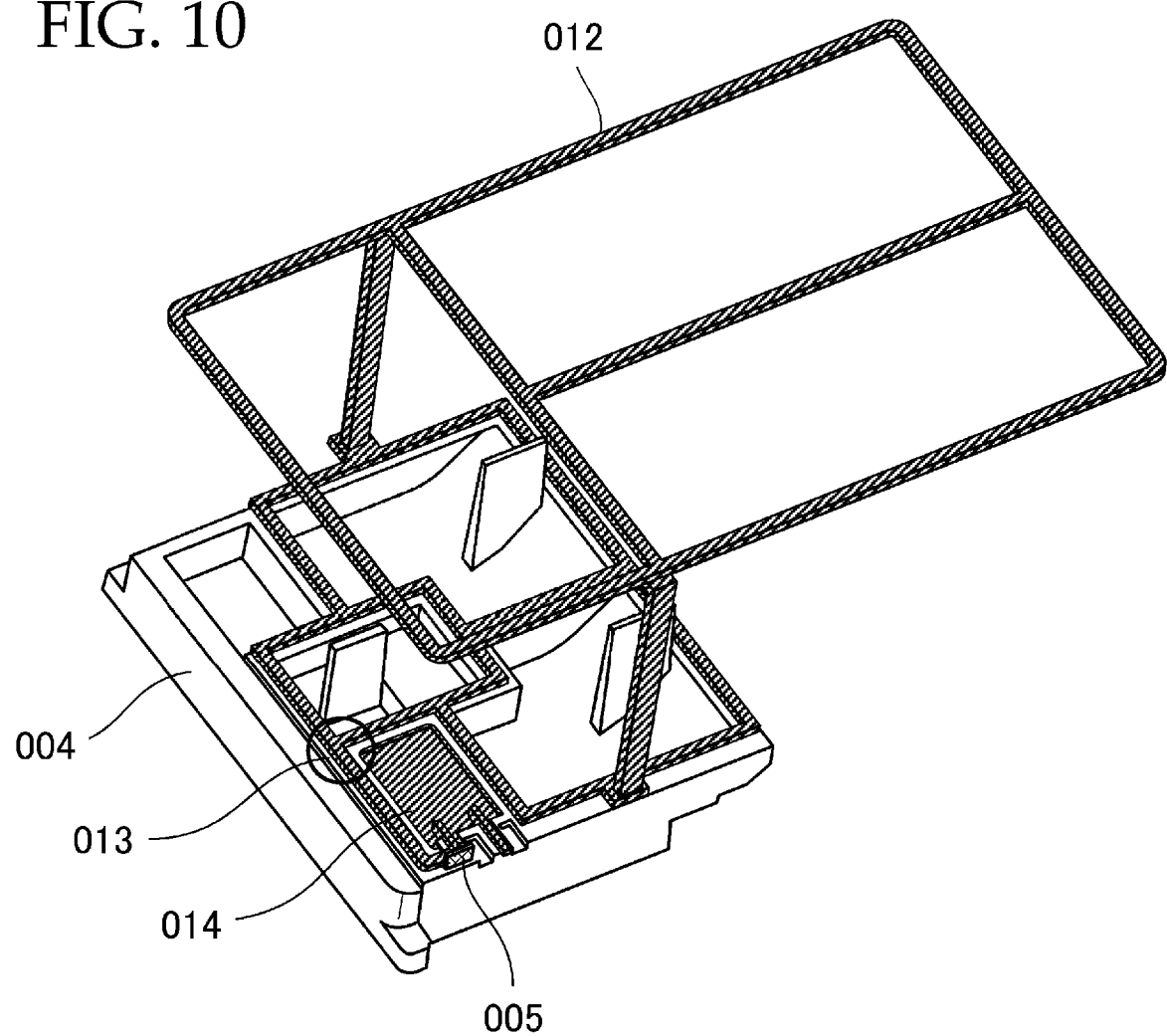
FIG. 10 is a perspective view showing a state at the time of bonding of the molten resin in Embodiment 2.
Figure 11:
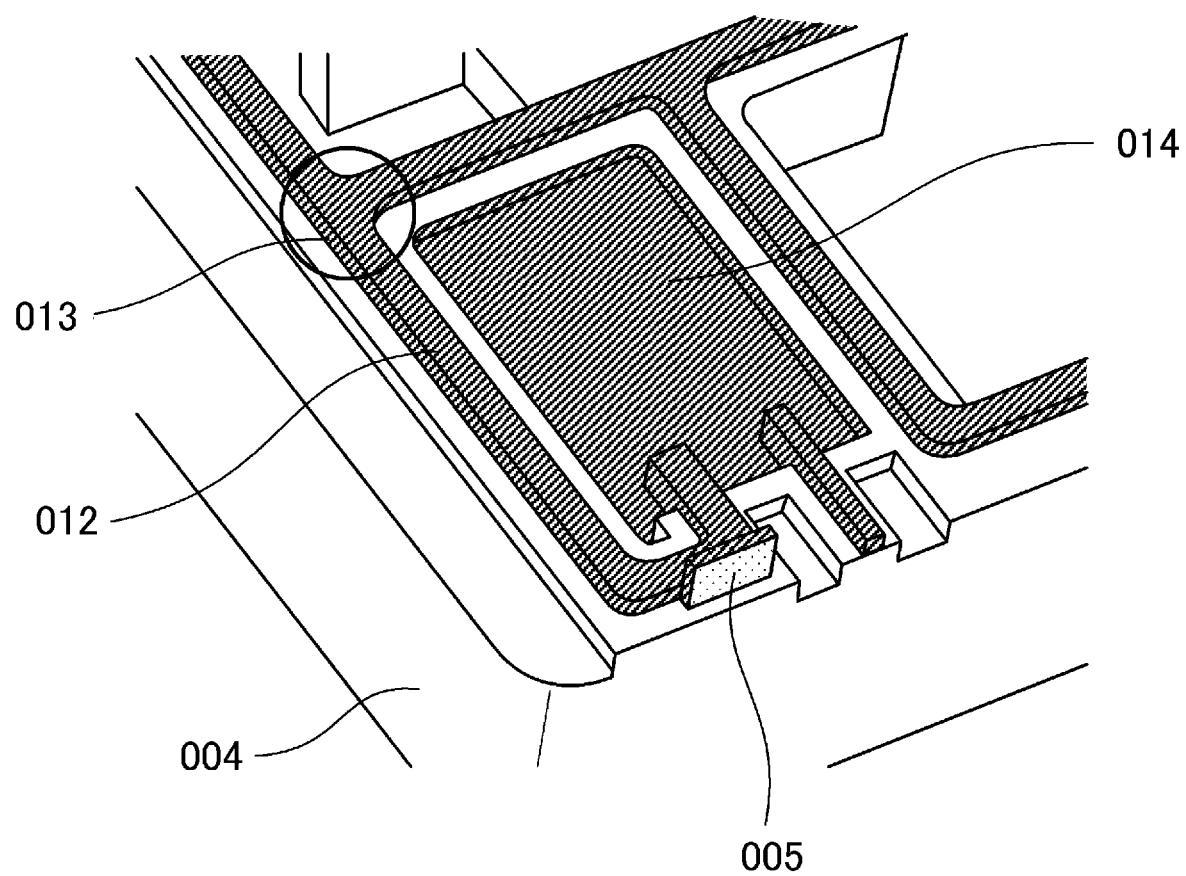
FIG. 11 is an enlarged perspective view of the vicinity of a buffer portion in Embodiment 2.

Then, Embodiment 2 will be described with reference to the drawings. The same components as those in the above embodiment are designated by the same reference numerals, and the description thereof will be simplified.
Configuration FIGS. 9 to 11 are schematic views each showing a method of allowing visual recognition of molded article bonding in Embodiment 2. FIG. 9 is a plan view showing a bonding surface of the third molded member 004 to the second molded member 003, and shows a configuration in which a buffer portion 014 is provided at an extension of the opening portion 005. FIG. 10 is a perspective view showing the bonding surface of the third molded member 004 to the second molded member 003, and shows a state at the time of bonding of the molten resin 012. FIG. 11 is a perspective view in which the vicinity of the buffer portion 014 in FIG. 7 is enlarged.

FIG. 9 is a view showing the bonding surface of the third molded member 004 to the second molded member 003. A difference in configuration from Embodiment 1 is that the buffer portion 014 is provided at the extension of the opening portion 005.

In the configuration of the present embodiment, when the molten resin 012 having flowed in from the gate 021 is cured, the molten resin 012 is formed into a shape shown in FIG. 10 in the liquid container. That is, FIG. 10 shows a state when the molten resin 012 functions as a bonding member.

FIG. 11 is a perspective view in which the vicinity of the buffer portion 014 in FIG. 10 is enlarged. As shown in FIGS. 9 and 11, a buffer portion communication flow path 020e and the buffer portion 014 are provided on the opposite side of the final filling portion 013 and the opening portion communication flow path 020d via the opening portion 005. It is possible to form the buffer portion communication flow path 020e and the buffer portion 014 by providing a groove or a concave portion in each molded member similarly to the other portions of the flow path.
Function of Buffer Portion The buffer portion 014 functions as a part which absorbs a deviation of a filling amount of the molten resin 012 which bonds coupled molded members together. That is, the use of the buffer portion 014 is different from that of the flow path 020 which serves as a path into which the molten resin 012 is poured.

Herein, in the configuration of Embodiment 1, the filling amount of the molten resin 012 is set to an amount which allows the molten resin 012 to reach at least the opening portion 005. However, there is a possibility that deviation may occur in the filling amount of the molten resin 012. In addition, there are cases where deviation occurs also in the total volume of the flow path 020 due to manufacturing errors of individual molded parts.

In the case where the filling amount is smaller than a design value or the total volume of the flow path 020 is larger than a design value, there is a possibility that the molten resin 012 may not reach the opening portion 005. To cope with this, based on the assumption that the deviation occurs, the filling amount of the molten resin 012 is set to an amount which allows the molten resin 012 to reach the opening portion 005. With this, even when the deviation occurs in the filling amount or the flow path total volume, it is possible to accurately perform product inspection.

On the other hand, in the case where the filling amount is larger than the design value or the total volume of the flow path 020 is smaller than the design value, there is a possibility that the molten resin 012 may have no place to go after reaching the opening portion 005. Thus, even in the case where the amount of the molten resin 012 is large for the flow path total volume, it is possible to absorb the molten resin 012 having flowed out beyond the opening portion 005 by providing the buffer portion 014 of the present embodiment.

Thus, by providing the buffer portion 014 at the extension portion of the opening portion 005 on the opposite side of the final filling portion 013, it is possible to absorb the deviation of the filling amount of the molten resin 012 while maintaining the effect of allowing the visual recognition of the state of the molten resin 012.

Embodiment 3

Then, Embodiment 3 will be described with reference to the drawings. The same components as those in the above embodiments are designated by the same reference numerals, and the description thereof will be simplified.

Figure 12:
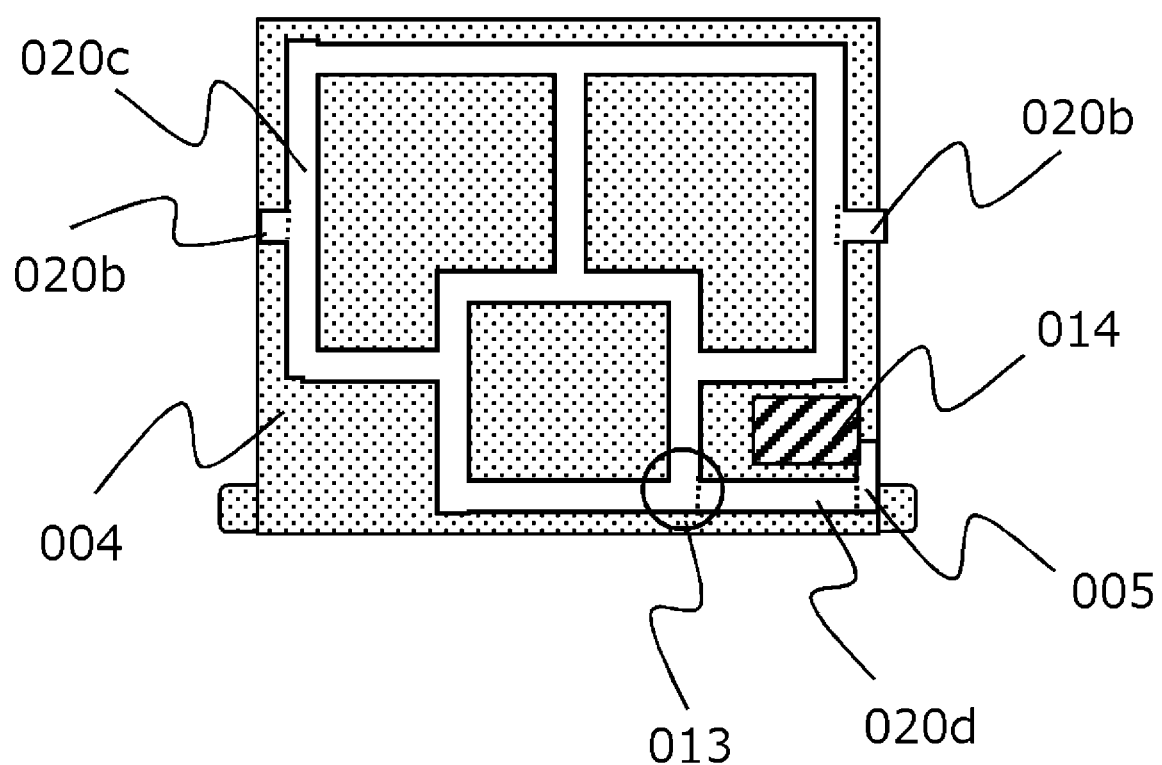
FIG. 12 is a schematic plan view showing a method of allowing visual recognition of molded article bonding in Embodiment 3.

FIG. 12 is a schematic plan view showing a method of allowing visual recognition of molded article bonding in Embodiment 3. The present embodiment is different from Embodiment 2 in that the buffer portion 014 is integrated with the opening portion 005. That is, the buffer portion communication flow path 020e is not provided, and the buffer portion 014 integrated with the opening portion 005 is formed.

Thus, even in the case where the buffer portion communication flow path 020e is not provided and the buffer portion 014 is integrated with the opening portion 005, the effect of storing the molten resin 012 caused to overflow by the deviation of the filling amount or the flow path total volume in the buffer portion 014 via the opening portion 005 is obtained.

In the configuration of the present embodiment, it is not necessary to provide the buffer portion communication flow path 020e, and hence the configuration thereof is effective in the case where a molded member size or a molten resin amount is limited. Accordingly, it becomes possible to reduce a cartridge size and reduce the amount of the resin to be used.

Embodiment 4

Then, Embodiment 4 will be described with reference to the drawings. The same components as those in the above embodiments are designated by the same reference numerals, and the description thereof will be simplified.

Figure 13:
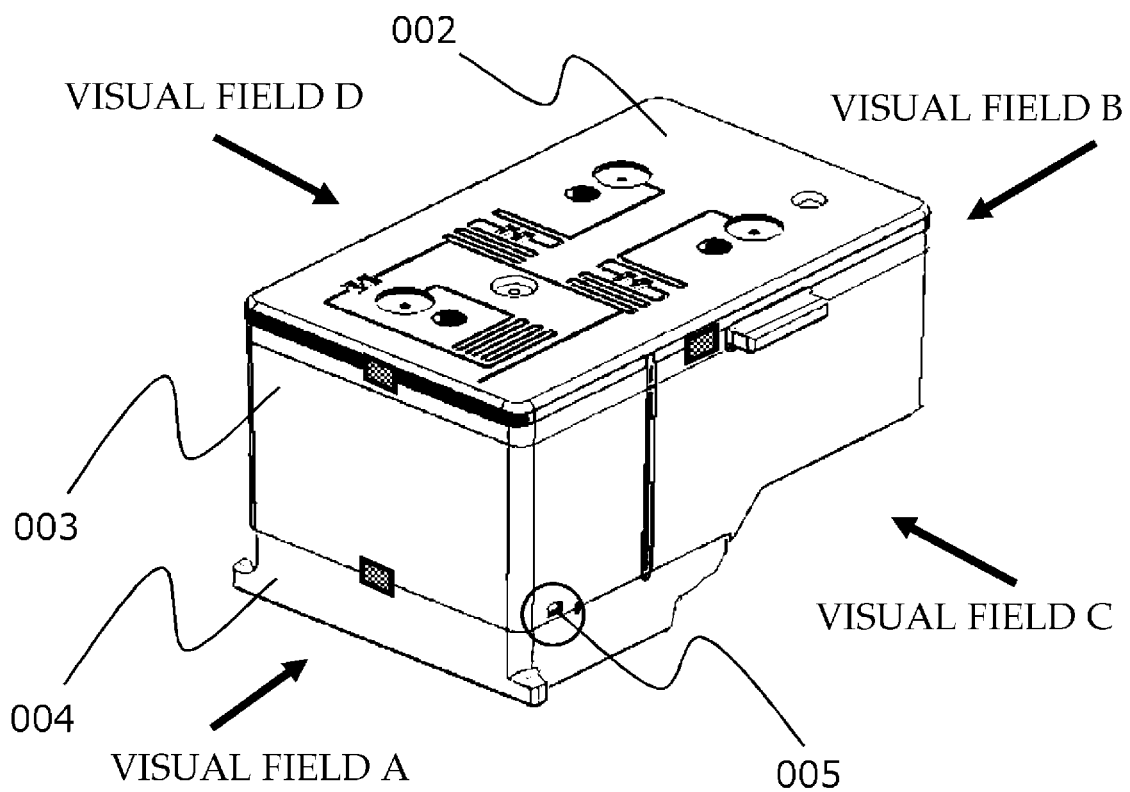
FIG. 13 is a schematic perspective view showing a direction of a visual field to a molded article in Embodiment 4.
Figure 14A:
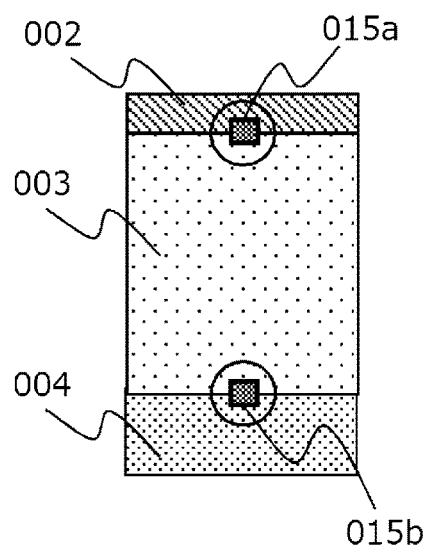
FIGS. 14A to 14D are schematic side views from the individual visual fields of the molded article.
Figure 14B:
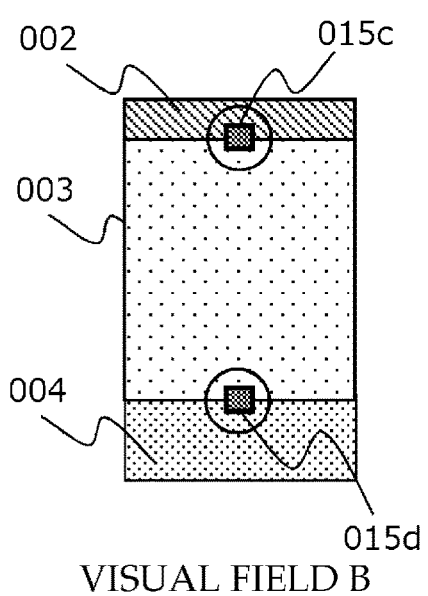
Figure 14C:
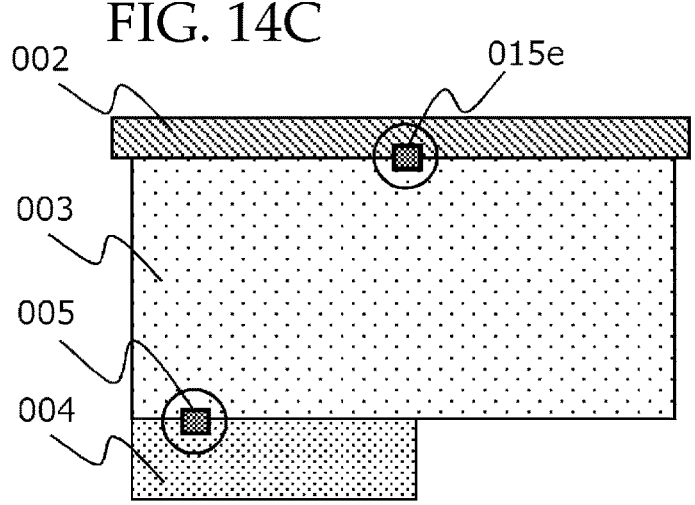
Figure 14D:
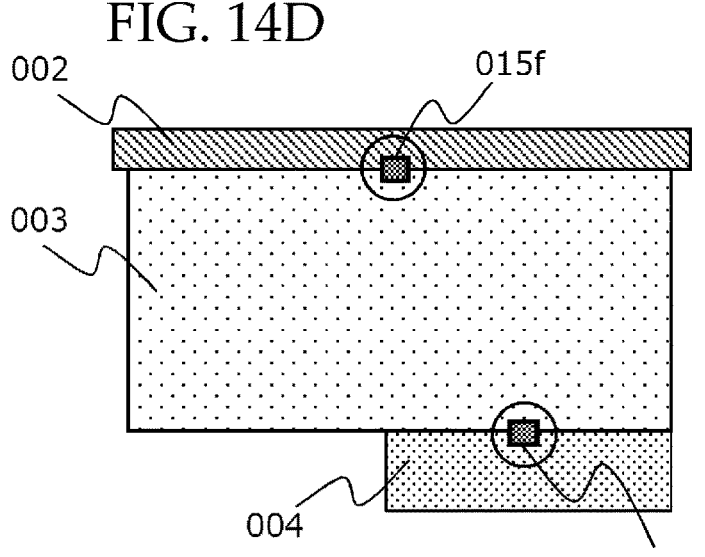
Figure 15:
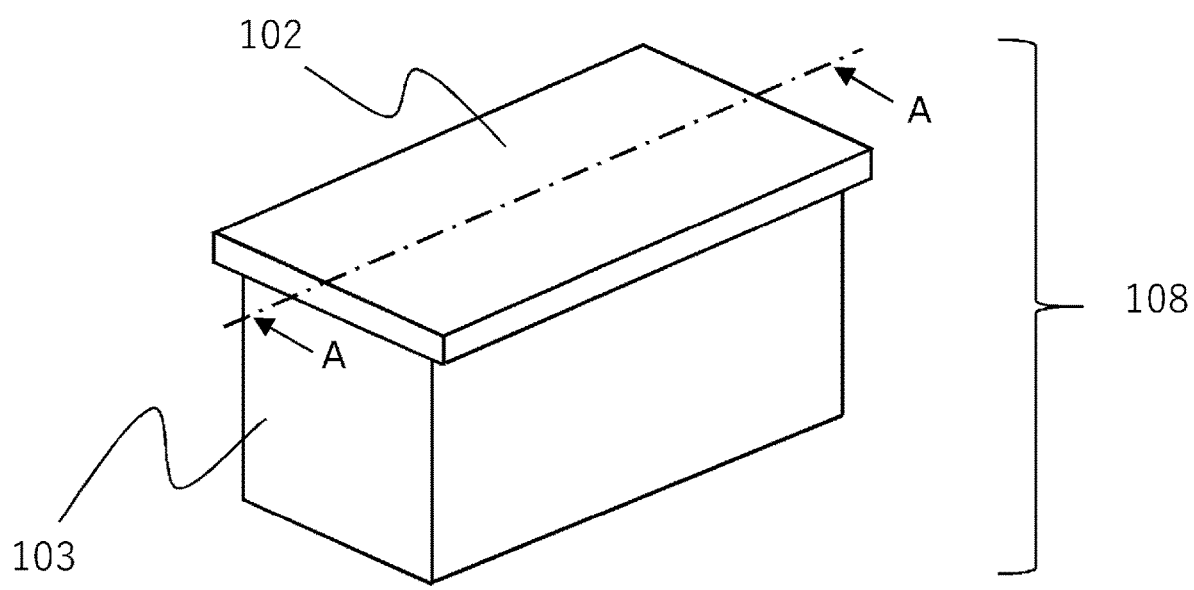
FIG. 15 is a schematic perspective view of a conventional liquid container.
Figure 16:
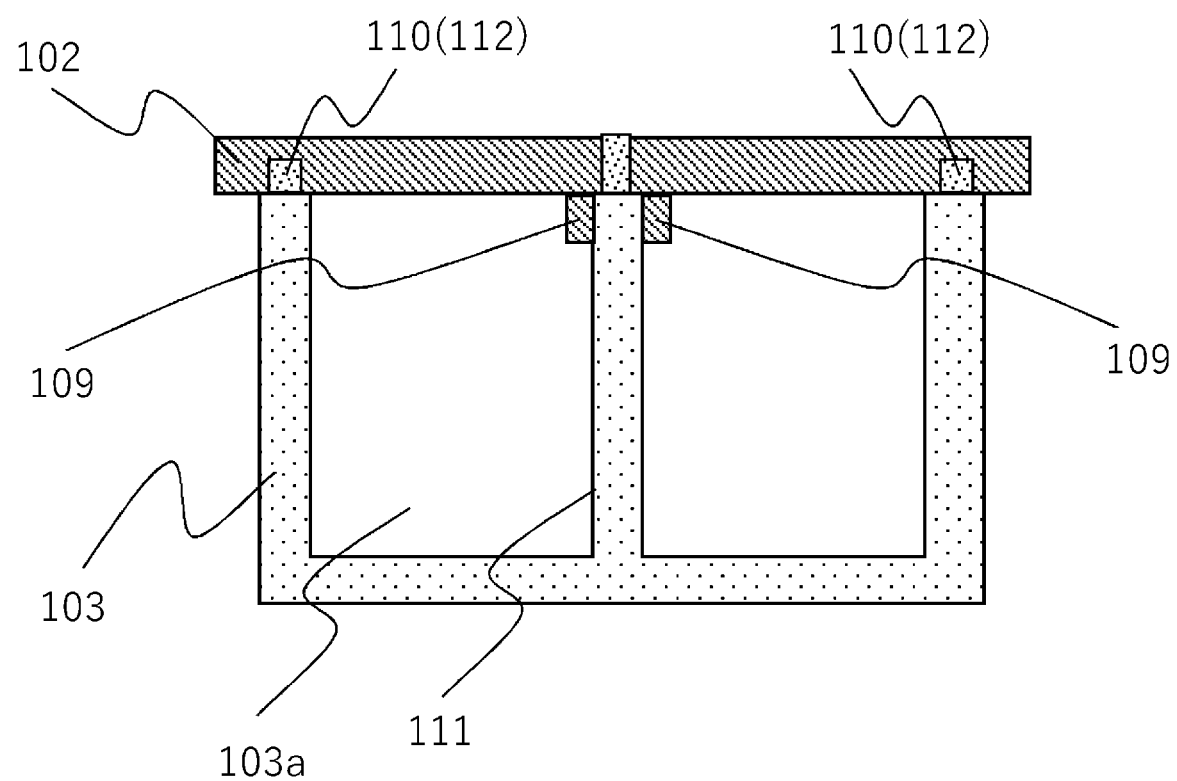
FIG. 16 is a cross-sectional view of the conventional liquid container.

FIG. 13 and FIGS. 14A to 14D are schematic views each showing a method of allowing visual recognition of molded article bonding in Embodiment 4. FIG. 13 shows a schematic perspective view of an entire molded article and a direction of each visual field. FIGS. 14A to 14D show schematic side views from the individual visual fields.

In each embodiment described above, the opening portion 005 which allows visual recognition of the state of the molten resin 012 is provided at the extension of the final filling portion 013. In the present embodiment, in addition to the opening portion 005, a plurality of intermediate opening portions 015a to 015g which allow visual recognition of a state of bonding of the molten resin 012 being in progress are provided.

Each of the intermediate opening portions 015a, 015c, 015e, and 015f is formed so as to branch from the upper flow path 020a and be exposed to the exterior of the cartridge 001. It is possible to inspect the state of bonding with the molten resin 012 being in progress between the first molded member 002 and the second molded member 003 by performing the visual recognition of the intermediate opening portions 015a, 015c, 015e, and 015f.

Each of the intermediate opening portions 015b, 015d, and 015g is formed so as to branch from the lower flow path 020c and be exposed to the exterior of the cartridge 001. It is possible to inspect the state of bonding with the molten resin 012 being in progress between the second molded member 003 and the third molded member 004 by performing the visual recognition of the intermediate opening portions 015b, 015d, and 015g.

With the configuration of the present embodiment, it becomes possible to visually recognize the state of bonding the molten resin 012 being in progress. As a result, the effect of facilitating identification of the location of occurrence of the leakage, overflowing, or shortage of the resin is achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-109186, filed on Jul. 6, 2022, which is hereby incorporated by reference wherein in its entirety.

What is claimed is:

1. A container, comprising:
a first member;
a second member; and
resin filling a flow path that is formed between the first member and the second member when the first member and the second member come into contact with each other, wherein
the resin bonds the first member and the second member to each other by reaching a filling target position after flowing from an inflow opening to the flow path, and
an opening portion is formed in an exterior of the container, the opening portion being provided facing a position where the resin, which has flowed in the flow path from the inflow opening, flows out beyond the filling target position, and
a buffer position which stores the resin having flowed out from the filling target position is provided in the flow path at a position facing the opening portion.

2. The container according to claim 1, wherein the opening portion is provided such that whether or not the resin has reached the opening portion can be visually recognized from the outside of the container.

3. The container according to claim 1, wherein the resin flows in from the inflow opening in a state in which the first member and the second member are housed inside a mold, and
the opening portion is covered with an inner wall of the mold when the first member and the second member are housed inside the mold.

4. The container according to claim 1, wherein the buffer portion is integrated with the opening portion.

5. The container according to claim 1, comprising a communication flow path that communicates the buffer portion and the opening portion with each other.

6. The container according to claim 1, comprising an intermediate opening portion exposed to the exterior of the container, the intermediate opening portion being provided at a position between the inflow opening and the filling target position in the flow path.

7. The container according to claim 6, comprising a plurality of the intermediate opening portions provided in the flow path.

8. A cartridge configured for use in an inkjet recording apparatus, the cartridge comprising:
the container according to claim 1 which stores ink; and
a chip which discharges the ink.

9. The container according to claim 1, wherein the resin is visible through the opening portion when the opening portion is viewed from outside.

10. The container according to claim 1, wherein the width of the buffer portion is wider than the width of the flow path.

11. A method of manufacturing a container including a first member and a second member, and having a flow path for resin formed between the first member and the second member when the first member and the second member come into contact with each other, the method comprising the steps of:
forming the flow path by causing the first member and the second member to come into contact with each other inside a mold; and bonding the first member and the second member to each other by causing the resin to flow in from an inflow opening to the flow path and to reach a filling target position, wherein an opening portion is formed in an exterior of the container, the opening portion is provided facing a position where the resin, which has flowed in from the inflow opening in the flow path, flows out beyond the filling target position, and a buffer portion which stores the resin having flowed out from the filling target position is provided in the flow path at a position facing the opening portion.

12. The method of manufacturing the container according to claim 11, further comprising a step of inspecting, by image processing, whether or not the resin is visible through the opening portion when the opening portion is viewed from outside.

13. A flow path member, comprising:
a first member,
a second member; and
resin filling a flow path that is formed between the first member and the second member when the first member and the second member come into contact with each other, wherein the resin bonds the first member and the second member to each other by reaching a filling target position after flowing from an inflow opening to the flow path, an opening portion is formed in an exterior of the container, the opening portion being provided facing a position where the resin, which has flowed in the flow path from the inflow opening, flows out beyond the filling target position, and, a buffer portion which stores the resin having flowed out from the filling target position is provided in the flow path at a position facing the opening portion.

* * * * *